United States Patent
He et al.

(10) Patent No.: US 12,335,964 B2
(45) Date of Patent: Jun. 17, 2025

(54) DATA SCHEDULING FOR REDUCED CAPABILITY UES

(71) Applicant: Apple Inc., Cupertino, CA (US)

(72) Inventors: Hong He, San Jose, CA (US); Chunhai Yao, Beijing (CN); Chunxuan Ye, San Diego, CA (US); Dawei Zhang, Saratoga, CA (US); Haitong Sun, Cupertino, CA (US); Huaning Niu, San Jose, CA (US); Jie Cui, San Jose, CA (US); Oghenekome Oteri, San Diego, CA (US); Seyed Ali Akbar Fakoorian, San Diego, CA (US); Sigen Ye, Whitehouse Station, NJ (US); Wei Zeng, Saratoga, CA (US); Weidong Yang, San Diego, CA (US); Yang Tang, San Jose, CA (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 566 days.

(21) Appl. No.: 17/593,578

(22) PCT Filed: Oct. 1, 2020

(86) PCT No.: PCT/CN2020/119772
§ 371 (c)(1),
(2) Date: Sep. 21, 2021

(87) PCT Pub. No.: WO2022/067839
PCT Pub. Date: Apr. 7, 2022

(65) Prior Publication Data
US 2022/0312464 A1  Sep. 29, 2022

(51) Int. Cl.
*H04W 72/23* (2023.01)

(52) U.S. Cl.
CPC .................. *H04W 72/23* (2023.01)

(58) Field of Classification Search
CPC ..................... H04W 72/23
See application file for complete search history.

(56) References Cited

U.S. PATENT DOCUMENTS

| 9,185,690 B2 | 11/2015 | Khoshnevis et al. |
| 10,721,722 B2 | 7/2020 | Sun et al. |

(Continued)

FOREIGN PATENT DOCUMENTS

| CN | 101651995 | 2/2010 |
| CN | 103427970 | 12/2013 |

(Continued)

OTHER PUBLICATIONS

Samsung, "Reduced PDCCH monitoring"; 3GPP TSG RAN WG1 #101; R1-2003911; Jun. 5, 2020; 5 sheets.

(Continued)

*Primary Examiner* — Saad A. Waqas
(74) *Attorney, Agent, or Firm* — Fay Kaplun & Marcin, LLP (57) ABSTRACT

A user equipment (UE) receives scheduling information from a base station of a wireless network. The UE monitors a first physical resource to receive a common downlink control information (DCI) portion of scheduling information for the UE, decodes the common DCI portion to determine information for a UE-specific DCI portion that is transmitted by the base station on a second physical resource, monitors the second physical resource for the UE-specific DCI portion based on at least the information from the common DCI and decodes the UE-specific DCI portion based on at least the information from the common DCI.

20 Claims, 6 Drawing Sheets

(56) References Cited

U.S. PATENT DOCUMENTS

| | | |
|---|---|---|
| 12,074,752 B2 | 8/2024 | Wu et al. |
| 12,177,022 B2 | 12/2024 | Wong et al. |
| 2013/0242750 A1 | 9/2013 | Baker |
| 2013/0294366 A1 | 11/2013 | Papasakellariou et al. |
| 2014/0071952 A1 | 3/2014 | Kim et al. |
| 2017/0367046 A1 | 12/2017 | Papasakellariou |
| 2018/0132272 A1 | 5/2018 | Sun et al. |
| 2018/0234998 A1 | 8/2018 | You et al. |
| 2019/0052432 A1 | 2/2019 | Islam et al. |
| 2019/0053209 A1 | 2/2019 | Huss et al. |
| 2019/0081820 A1 | 3/2019 | Urabayashi |
| 2019/0261218 A1 | 8/2019 | Khoshnevisan et al. |
| 2019/0357184 A1 | 11/2019 | Tang et al. |
| 2019/0394798 A1 | 12/2019 | Tomeba et al. |
| 2020/0022144 A1 | 1/2020 | Papasakellariou |
| 2020/0022177 A1 | 1/2020 | Liu et al. |
| 2020/0100263 A1 | 3/2020 | Gupta et al. |
| 2020/0205157 A1 | 5/2020 | Zhu |
| 2020/0404667 A1 | 12/2020 | Khoshnevisan et al. |
| 2021/0314866 A1 | 10/2021 | Lee et al. |
| 2022/0039158 A1 | 2/2022 | Awadin et al. |
| 2022/0174537 A1 | 6/2022 | Harada et al. |
| 2022/0240187 A1 | 7/2022 | Guo et al. |
| 2022/0312462 A1 | 9/2022 | He et al. |
| 2022/0322346 A1 | 10/2022 | Sun et al. |
| 2023/0035989 A1 | 2/2023 | Awadin et al. |
| 2023/0269722 A1* | 8/2023 | Xu ........................ H04L 1/1822 370/329 |

FOREIGN PATENT DOCUMENTS

| | | |
|---|---|---|
| CN | 105453624 | 3/2016 |
| CN | 108400830 | 8/2018 |
| CN | 108633010 | 10/2018 |
| CN | 109565403 | 4/2019 |
| CN | 110536439 | 12/2019 |
| CN | 110971361 | 4/2020 |
| CN | 111713052 | 9/2020 |
| GB | 2577533 | 4/2020 |
| WO | 2018/085429 | 5/2018 |
| WO | 2018/132983 | 7/2018 |
| WO | 2020/055212 | 3/2020 |
| WO | 2021/033118 | 2/2021 |

OTHER PUBLICATIONS

CMCC, "Discussion on reduced PDCCH monitoring"; 3GPP TSG RAN WG1 #102-e; R1-2006218; Aug. 28, 2020; 3 sheets.

* cited by examiner

DATA SCHEDULING FOR REDUCED CAPABILITY UES

BACKGROUND 5G new radio (NR) wireless communications support a variety of different types of user equipment (UEs). For example, in addition to mobile phones, 5G NR supports internet of things (IoT) devices, industrial IoT (IIoT) devices, wearable devices, etc. Some of these devices are known as reduced capability (RedCap) UEs, which have varying wireless capabilities compared to other UEs. There may be situations where the network would like to treat RedCap UEs differently than other types of UEs.

SUMMARY

Some exemplary embodiments are related to a user equipment (UE) having a transceiver configured to connect to a base station of a network and a processor communicatively coupled to the transceiver and configured to perform operations. The operations include monitoring a first physical resource to receive a common downlink control information (DCI) portion of scheduling information for the UE, decoding the common DCI portion to determine information for a UE-specific DCI portion that is transmitted by the base station on a second physical resource, monitoring the second physical resource for the UE-specific DCI portion based on at least the information from the common DCI and decoding the UE-specific DCI portion based on at least the information from the common DCI.

Other exemplary embodiments are related to a baseband processor configured to perform operations. The operations include monitoring a first physical resource to receive a common downlink control information (DCI) portion of scheduling information for the UE, decoding the common DCI portion to determine information for a UE-specific DCI portion that is transmitted by the base station on a second physical resource, monitoring the second physical resource for the UE-specific DCI portion based on at least the information from the common DCI and decoding the UE-specific DCI portion based on at least the information from the common DCI.

DETAILED DESCRIPTION

The exemplary embodiments may be further understood with reference to the following description and the related appended drawings, wherein like elements are provided with the same reference numerals. The exemplary embodiments describe a manner of dividing downlink (DL) and/or uplink (UL) scheduling information into two portions and transmitting the different portions on different physical channels/signals.

The exemplary embodiments are described with regard to a network that includes 5G new radio NR radio access technology (RAT). However, the exemplary embodiments may be implemented in other types of networks using the principles described herein.

The exemplary embodiments are also described with regard to a UE. However, the use of a UE is merely for illustrative purposes. The exemplary embodiments may be utilized with any electronic component that may establish a connection with a network and is configured with the hardware, software, and/or firmware to exchange information and data with the network. Therefore, the UE as described herein is used to represent any electronic component.

As noted above, there are various types of UEs, each having different capabilities that may connect to the 5G NR network. Prior to describing the exemplary embodiments, several examples of RedCap UEs and their characteristics will be described. In a first example, devices in industrial settings such as temperature or humidity sensors may be connected industry devices. However, such devices are stationary, are not latency critical, and are fairly uncomplex with respect to their capabilities and hardware. These devices typically do not require the low latency data exchange provided by ultra reliable low latency communication (URLLC) or IIoT. It is also expected that these devices will operate in the field for many years with little to no maintenance, including battery replacement. Thus, power saving operations may be critical for these types of devices.

Another example of RedCap type devices with capabilities that differ from other UEs are surveillance devices (e.g., cameras). These devices are similar to the devices in the first example in that they are typically stationary and do not have stringent latency requirements. However, they may differ from the first example because these devices may be connected to a permanent power supply (although not required) and may have much higher upload data rates than many other UEs because of, for example, the video upload feeds they are providing.

Yet another example of RedCap type devices with different capabilities than many other UEs are wearable devices. Unlike the above examples, wearables typically have similar mobility to mobile phones and operations related to the same types of applications that are executable on mobile phones. However, because of the smaller form factor resulting in smaller batteries, these devices have a more stringent power saving requirement than mobile phones.

These examples of different types of UEs are by no means an exhaustive list of 5G-capable devices, but are provided as an example of the varying capabilities of different UEs that are connected to the 5G NR wireless network at any given time. Devices that are considered RedCap devices may be determined in various manners. For example, RedCap devices may be defined by the class of device (e.g., wearables, surveillance device, etc.). In another example, RedCap devices may be defined by the capability/functionality of the devices (e.g., battery life, processing power, latency requirements, etc.). The definition of what qualifies a UE as a RedCap UE may be set by standards (e.g., 3GPP standards) or may be left to the individual network provider.

As described above, one of the considerations for RedCap devices may be more stringent power savings than standard UEs to reduce battery use and extend battery life. An exemplary manner of reducing power consumption may be to reduce monitoring of the Physical Downlink Control Channel (PDCCH) by RedCap devices. This reduced monitoring of the PDCCH may include a smaller number of blind decodes and control channel element (CCE) limits. However, there may be issues associated with a reduced number of blind decodes and CCE limits. For example, this may lead to an increased PDCCH blocking probability that may cause latency increase. This issue may be more severe for RedCap devices because they typically use larger aggregation levels/CCEs due to the reduced number of Rx antennas and bandwidth.

According to some exemplary embodiments, the downlink (DL) and/or uplink (UL) scheduling information may be divided into two portions, a common DCI portion and a UE-specific DCI portion. These different portions of a single scheduling may be transmitted on different physical channels/signals. The exemplary scheduling information will be described in greater detail below.

Figure 1:
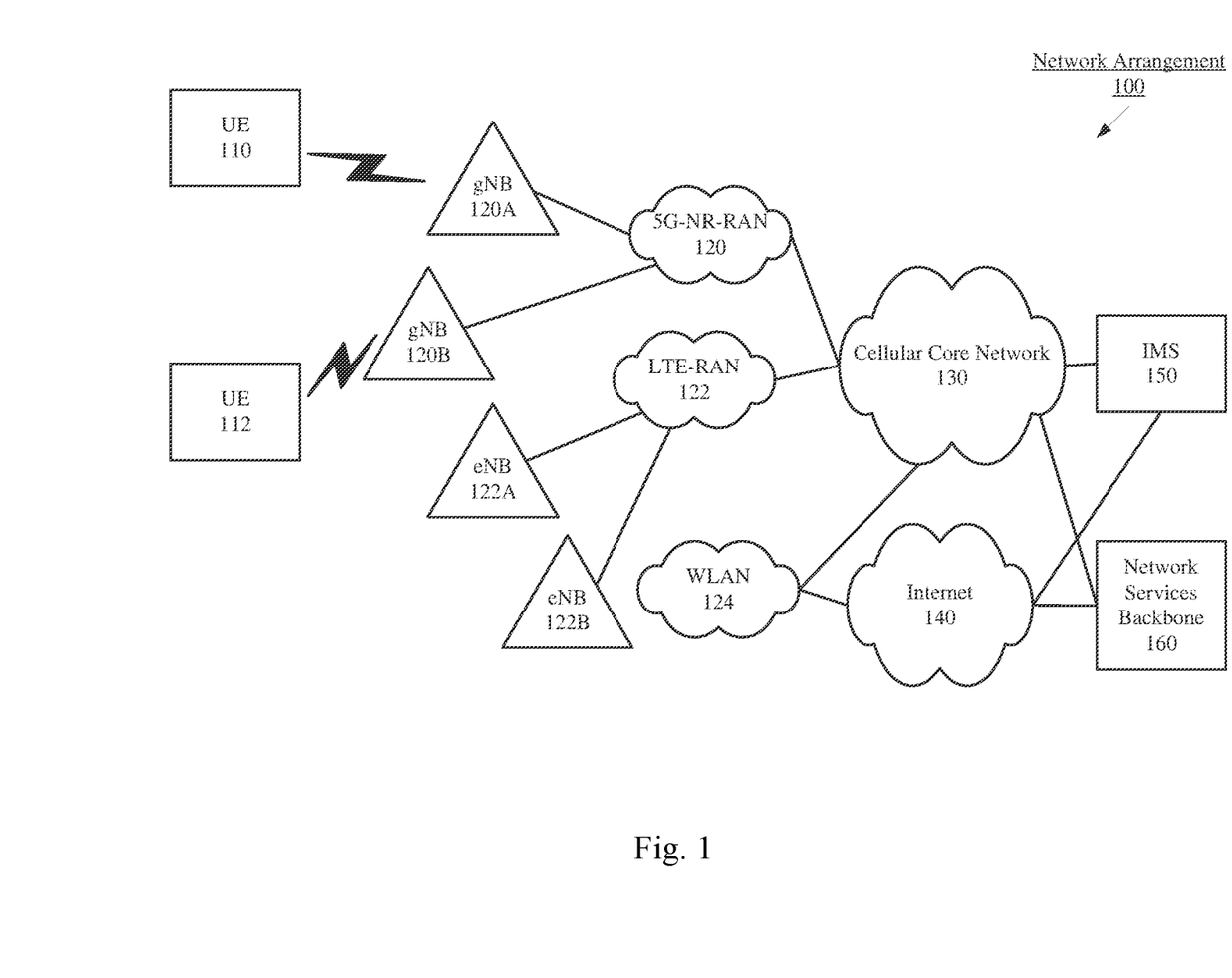
FIG. 1 shows an exemplary network arrangement according to various exemplary embodiments.

FIG. 1 shows an exemplary network arrangement 100 according to various exemplary embodiments. The exemplary network arrangement 100 includes a UE 110. It should be noted that any number of UEs may be used in the network arrangement 100. Those skilled in the art will understand that the UE 110 may alternatively be any type of electronic component that is configured to communicate via a network, e.g., mobile phones, tablet computers, desktop computers, smartphones, phablets, embedded devices, wearables, Internet of Things (IoT) devices, etc. It should also be understood that an actual network arrangement may include any number of UEs being used by any number of users. Thus, the example of a single UE 110 is merely provided for illustrative purposes.

The UE 110 may be configured to communicate with one or more networks. In the example of the network configuration 100, the networks with which the UE 110 may wirelessly communicate are a 5G New Radio (NR) radio access network (5G NR-RAN) 120, an LTE radio access network (LTE-RAN) 122 and a wireless local access network (WLAN) 124. However, it should be understood that the UE 110 may also communicate with other types of networks and the UE 110 may also communicate with networks over a wired connection. Therefore, the UE 110 may include a 5G NR chipset to communicate with the 5G NR-RAN 120, an LTE chipset to communicate with the LTE-RAN 122 and an ISM chipset to communicate with the WLAN 124.

The 5G NR-RAN 120 and the LTE-RAN 122 may be portions of cellular networks that may be deployed by cellular providers (e.g., Verizon, AT&T, T-Mobile, etc.). These networks 120, 122 may include, for example, cells or base stations (Node Bs, eNodeBs, HeNBs, eNBS, gNBs, gNodeBs, macrocells, microcells, small cells, femtocells, etc.) that are configured to send and receive traffic from UE that are equipped with the appropriate cellular chip set. The WLAN 124 may include any type of wireless local area network (WiFi, Hot Spot, IEEE 802.11x networks, etc.).

The UE 110 may connect to the 5G NR-RAN 120 via the gNB 120A and/or the gNB 120B. During operation, the UE 110 may be within range of a plurality of gNBs. Thus, either simultaneously or alternatively, the UE 110 may connect to the 5G NR-RAN 120 via the gNBs 120A and 120B. Further, the UE 110 may communicate with the eNB 122A of the LTE-RAN 122 to transmit and receive control information used for downlink and/or uplink synchronization with respect to the 5G NR-RAN 120 connection.

Those skilled in the art will understand that any association procedure may be performed for the UE 110 to connect to the 5G NR-RAN 120. For example, as discussed above, the 5G NR-RAN 120 may be associated with a particular cellular provider where the UE 110 and/or the user thereof has a contract and credential information (e.g., stored on a SIM card). Upon detecting the presence of the 5G NR-RAN 120, the UE 110 may transmit the corresponding credential information to associate with the 5G NR-RAN 120. More specifically, the UE 110 may associate with a specific base station (e.g., the gNB 120A of the 5G NR-RAN 120).

In addition to the networks 120, 122 and 124 the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network, e.g. the 5GC for NR. The cellular core network 130 also manages the traffic that flows between the cellular network and the Internet 140.

The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
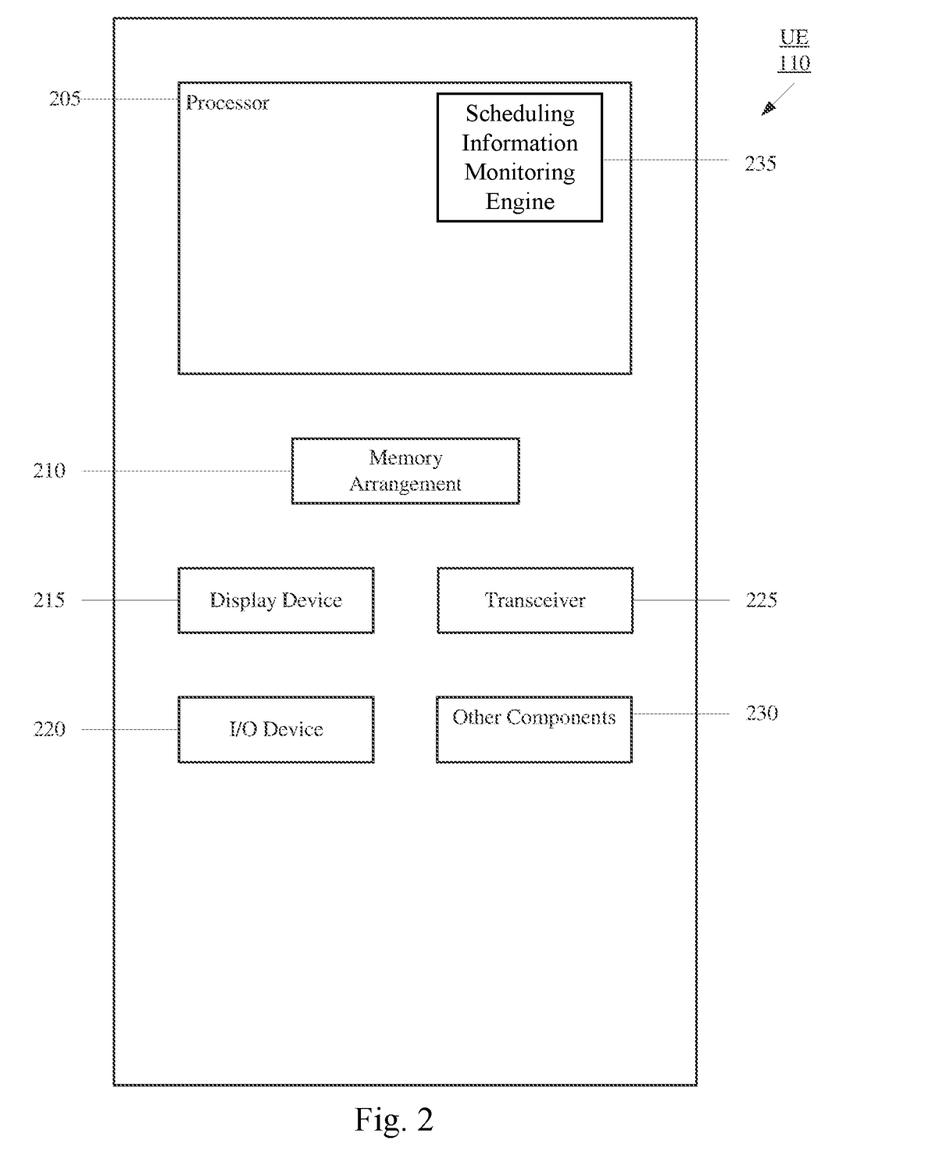
FIG. 2 shows an exemplary UE according to various exemplary embodiments.

FIG. 2 shows an exemplary UE 110 according to various exemplary embodiments. The UE 110 will be described with regard to the network arrangement 100 of FIG. 1. For purposes of this discussion, the UE 110 may be considered to be a reduced capability (RedCap) UE. However, it should be noted that the UE 110 may represent any electronic device and may include a processor 205, a memory arrangement 210, a display device 215, an input/output (I/O) device 220, a transceiver 225 and other components 230. The other components 230 may include, for example, an audio input device, an audio output device, a battery that provides a limited power supply, a data acquisition device, ports to electrically connect the UE 110 to other electronic devices, one or more antenna panels, etc. For example, the UE 110 may be coupled to an industrial device via one or more ports.

The processor 205 may be configured to execute a plurality of engines of the UE 110. For example, the engines may include a scheduling information monitoring engine 235. The scheduling information monitoring engine 235 may perform various operations related to monitoring for scheduling information from the network.

The above referenced engine being an application (e.g., a program) executed by the processor 205 is only exemplary. The functionality associated with the engine may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UE, the functionality described for the processor 205 is split among two or more processors such as a baseband processor and an applications processor. The exemplary embodiments may be implemented in any of these or other configurations of a UE.

The memory arrangement 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G NR-RAN 120, the LTE-RAN 122, the WLAN 124, etc. Accordingly, the transceiver 225 may operate on a variety of different frequencies or channels (e.g., set of consecutive frequencies).

Figure 3:
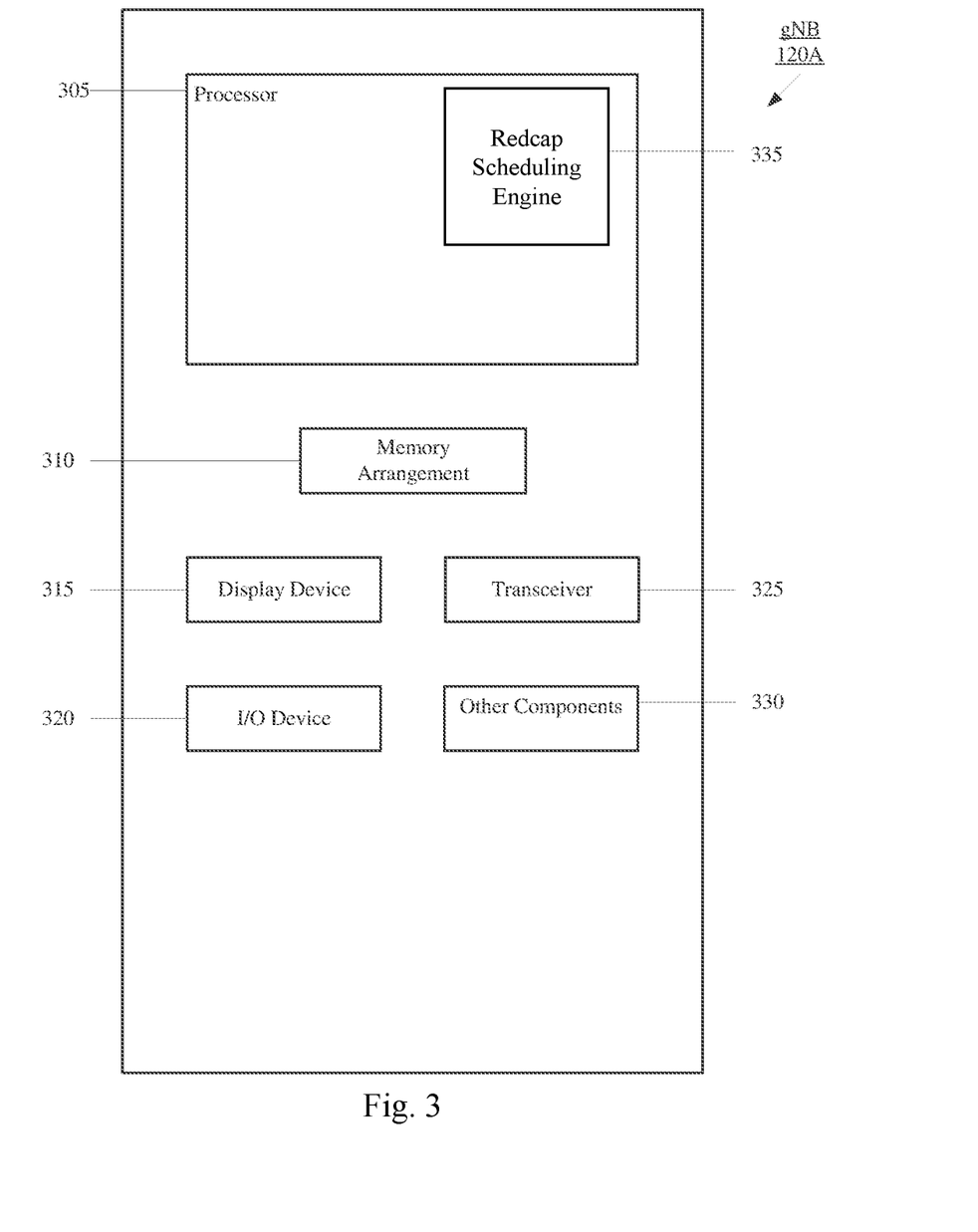
FIG. 3 shows an exemplary base station configured to establish a connection with a user equipment according to various exemplary embodiments.

FIG. 3 shows an exemplary network cell, in this case gNB 120A, according to various exemplary embodiments. The gNB 120A may represent any access node of the 5G NR network through which the UEs 110 may establish a connection. The gNB 120A illustrated in FIG. 3 may also represent the gNB 120B.

The gNB 120A may include a processor 305, a memory arrangement 310, an input/output (I/O) device 320, a transceiver 325, and other components 330. The other components 330 may include, for example, a power supply, a data acquisition device, ports to electrically connect the gNB 120A to other electronic devices, etc.

The processor 305 may be configured to execute a plurality of engines of the gNB 120A. For example, the engines may include a RedCap scheduling engine 335 for performing operations related to scheduling RedCap devices. Examples of scheduling the RedCap devices will be described in greater detail below.

The above noted engine being an application (e.g., a program) executed by the processor 305 is only exemplary. The functionality associated with the engines may also be represented as a separate incorporated component of the gNB 120A or may be a modular component coupled to the gNB 120A, e.g., an integrated circuit with or without firmware. For example, the integrated circuit may include input circuitry to receive signals and processing circuitry to process the signals and other information. In addition, in some gNBs, the functionality described for the processor 305 is split among a plurality of processors (e.g., a baseband processor, an applications processor, etc.). The exemplary aspects may be implemented in any of these or other configurations of a gNB.

The memory 310 may be a hardware component configured to store data related to operations performed by the UEs 110, 112. The I/O device 320 may be a hardware component or ports that enable a user to interact with the gNB 120A. The transceiver 325 may be a hardware component configured to exchange data with the UE 110 and any other UE in the system 100. The transceiver 325 may operate on a variety of different frequencies or channels (e.g., set of consecutive frequencies). Therefore, the transceiver 325 may include one or more components (e.g., radios) to enable the data exchange with the various networks and UEs.

As described above, in some exemplary embodiments, the downlink (DL) and/or uplink (UL) scheduling information may be divided into two portions, a common DCI portion and a UE-specific DCI portion. These different portions of a single scheduling may be transmitted on different physical channels/signals. Fr example, the common DCI portion may be transmitted on the PDCCH and UE-specific DC portion may be mapped on the (Physical Downlink Control Channel (PDSCH). In some exemplary embodiments, the frequency domain resource assignment (FDRA) for the PDSCH including the UE-specific DCI portion may be conveyed to the UE in the common DCI portion.

Figure 4:
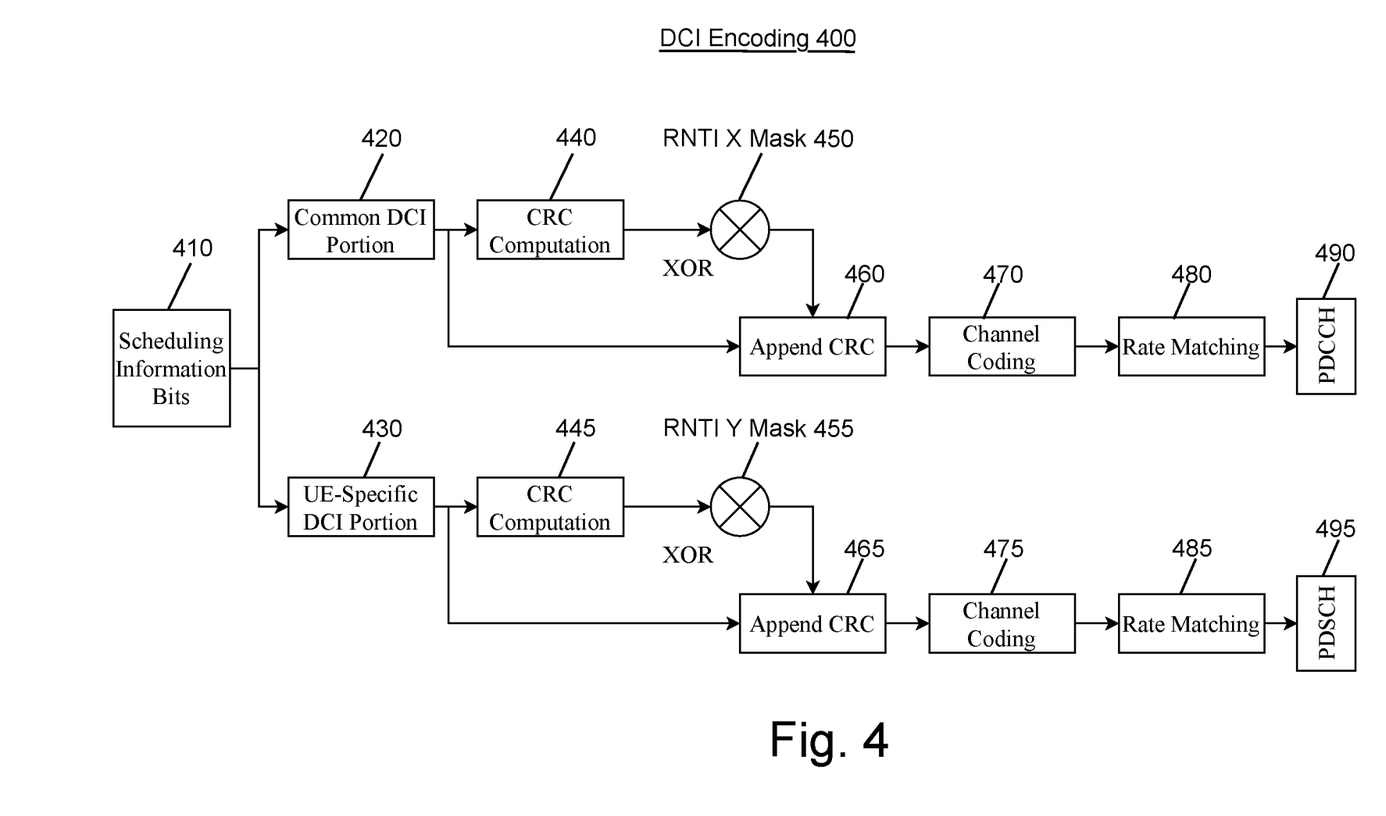
FIG. 4 shows an exemplary encoding process for the scheduling information according to various exemplary embodiments.

FIG. 4 shows an exemplary encoding process 400 for the scheduling information according to various exemplary embodiments. This encoding process 400 may be performed by, for example, the gNB 120A, when sending scheduling information to the UE 110. In the exemplary encoding process 400, separate coding steps may be applied for the common DCI portion and UE-specific DCI portion, including independent channel coding and respective CRC attachments.

In 410, the gNB 120A has the scheduling information bits for the UE 110. As will be described in greater detail below, the scheduling information bits 410 may include scheduling information for multiple UEs. The gNB 120A may then divide the scheduling information bits 410 into a common DCI portion 420 and a UE-specific DCI portion 430. The gNB 120A may then separately encode each of the portions. For example, the common DCI portion 420 may be encoded by the steps of cyclical redundancy check (CRC) computation 440, applying a Radio Network Temporary Identifier (RNTI) mask 450, appending the CRC 460, channel coding 470, rate matching 480 and mapping the encoded common DCI portion 490 to the PDCCH. Similarly, the UE-specific DCI portion 430 may be encoded by the steps of cyclical redundancy check (CRC) computation 445, applying a Radio Network Temporary Identifier (RNTI) mask 455, appending the CRC 465, channel coding 475, rate matching 485 and mapping the encoded common DCI portion 495 to the PDSCH.

In some exemplary embodiments, a common RNTI may be used to mask the CRC of the common DCI portion and UE-specific DCI portion to enable the UE(s) to identify the corresponding DCI portion. For example, the RNTI 'X' of 450 and RNTI 'Y' of 455 may be the same. For example, the RNTIs may be a group-common RNTI that is assigned to more than one UE by the gNB 120A. Consider the example of RedCap devices that are industrial sensors. Multiple of the industrial sensors may be assigned the same RNTI by the gNB 120A. Thus, UE 110 may be assigned the same RNTI as multiple other UEs.

In other exemplary embodiments, the RNTI 'X' of 450 and RNTI 'Y' of 455 may be different. In still further exemplary embodiments, the RNTI scrambling may only be used for one of the portions. For example, only the RNTI 'X' of 450 is used for scrambling the common DCI portion 420 and no RNTI scrambling is applied to the UE-specific DCI portion 130 as it is mapped to a dedicated PDSCH resource. In the example of FIG. 4, the scrambling is based on an XOR operation. However, any type of operation may be used for scrambling.

In some exemplary embodiments, the length of CRC 440, 445 may be the same or different. For example, a shorter CRC (e.g., length-8) may be used in 445 as it is mapped on a PDSCH resource. The masked CRC bits may be appended to associated portion bits using a CRC append operation.

The following provides a description of exemplary information (or fields) that may be included in the common DCI portion 420 of the scheduling information. It should be understood that the following fields are only exemplary. The common DCI portion 420 may include all the described fields, a subset of the described fields or additional fields not specifically described herein. In a first example, the common DCI portion 420 may include a DCI Format Flag that may be used to differentiate DCI formats with a same size. In a second example, the common DCI portion 420 may include a Frequency Domain Resource Assignment (FDRA) field that may be used to allocate resources in the frequency domain. In a third example, the common DCI portion 420 may include a Time Domain Resource Allocation (TDRA) field that may be used to allocate resources in the time domain. In a fourth example, the common DCI portion 420 may include a UE-specific DCI portion payload size indicator field that may be used to signal the payload size of the UE-specific DCI portion 430. In a fifth example, the common DCI portion 420 may include a UE-specific DCI portion resource size indicator field that may be used to signal the resource size of the UE-specific DCI portion 430. In a sixth example, the common DCI portion 420 may include a Modulation and Coding Scheme (MCS) field. Some of these examples will be described in greater detail below.

Figure 5:
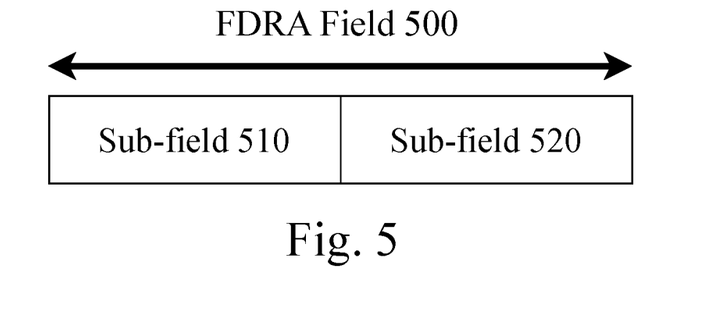
FIG. 5 shows an exemplary FRDA field of the common DCI portion according to various exemplary embodiments.

As described above, the common DCI portion 420 may include a FDRA field for both DL and UL scheduling. FIG. 5 shows an exemplary FRDA field 500 of the common DCI portion 420 according to various exemplary embodiments. In this example, the FRDA field 500 includes a sub-field 510 and a sub-field 520. In some exemplary embodiments, the sub-field 510 may include a bitmap corresponding to the first expression of the below equation (1) and the sub-field 520 may include a bitmap corresponding to the second expression of the below equation (1). In some exemplary embodiments, the FRDA may be represented by:

$$\left[\log_2\left[\frac{N_{RB}}{N_{Redcap}}\right]\right] + \left[\log_2(N_{RedCap}(N_{RedCap}+1)/2)\right] \quad \text{Equation (1)}$$

A bitmap in sub-field 510 with $$\left[\log_2\left[\frac{N_{RB}}{N_{Redcap}}\right]\right]$$

bits may provide the starting Redcap-SB index, where $N_{RB}$ is the DL or UL bandwidth configuration expressed in number of resource blocks (RBs) and $N_{Redcap}$ is the RedCap bandwidth configuration expressed in the number of RBs. In one example, $N_{Redcap}$ may be defined by standard (e.g., 3GPP standards) and may, for example, correspond to a 20 MHz bandwidth.

A bitmap with resource allocation Type 1 in sub-field 520 with $[\log_2 (N_{Redcap} (N_{Redcap}+1)/2)]$ bits may be used to indicate to scheduled UEs a set of contiguously allocated non-interleaved virtual resource blocks within one Redcap subband (Redcap-SB).

In other exemplary embodiments, the sub-field 510 may include a bitmap corresponding to the first expression of the below equation (2) and the sub-field 520 may include a bitmap corresponding to the second expression of the below equation (2). In some exemplary embodiments, the FRDA may be represented by:

$$\left[\log_2\left[\frac{N_{RB}}{N_{Redcap} * N_{NB}}\right]\right] + \left[\log_2(N_{NB}(N_{RB}+1)/2)\right] \quad \text{Equation (2)}$$

In this example, RedCap narrow bands (NBs) may be used to further reduce the signaling overhead. $N_{NB}$ may be non-overlapping consecutive physical resource blocks (PRB) in the frequency domain. The total NBs in the RedCap bandwidth may be given by:

$$N_{NRedCap, NB} = \frac{N_{Redcap}}{N_{NB}}.$$

In some exemplary embodiments, the value of $N_{NB}$ may be configured by system information blocks or dedicated Radio Resource Control (RRC) signaling on a per UE basis. In other exemplary embodiments, the value of $N_{NB}$ may be provided by standards (e.g., 3GPP standards), for example, based on numerology.

In still further exemplary embodiments, the sub-field 510 may include a bitmap corresponding to the first expression of the below equation (3) and the sub-field 520 may include a bitmap corresponding to the second expression of the below equation (3). In some exemplary embodiments, the FRDA may be represented by:

$$\left[\log_2\left[\frac{N_{RB}}{N_{Redcap} * N_{NB}}\right]\right] + [\log_2 K] \quad \text{Equation (3)}$$

The first expression is the same as the first expression of equation (2). In this example, a set of resource configurations may be provided by gNB 120A to one or more UEs. This information includes the starting RBs and number of consecutive RBs. One of the configured resource sets is dynamically indicated by the FDRA sub-field 520 portion using [$\log_2$ K] where K is the number of RB resource sets. An example of this type of exemplary embodiment is provided below with reference to FIG. 6.

Figure 6:
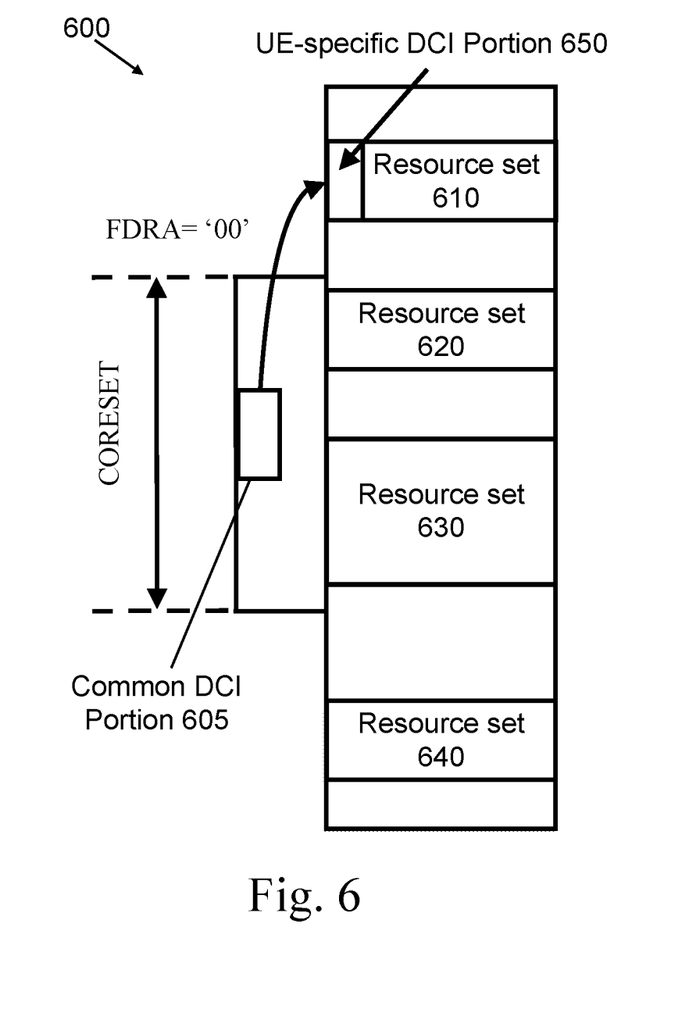
FIG. 6 illustrates an example diagram showing the common DCI portion providing a set of resource configurations for the Frequency Domain Resource Assignment (FDRA) according to various exemplary embodiments.

FIG. 6 illustrates an example diagram 600 showing the common DCI portion providing a set of resource configurations for the Frequency Domain Resource Assignment (FDRA) according to various exemplary embodiments. In the example of FIG. 6, it may be considered that K=4, e.g., there are 4 RB resource sets. In FIG. 6, these 4 RB resource sets are shown as Resource Set 0-610, Resource Set 1-620, Resource Set 2-630 and Resource Set 4-640. It may also be considered that the FDRA sub-field 520 is 2 bits, enabling the field to identify any of the Resource Sets 610-640 (e.g., 00, 01, 10, 11, each corresponding to one of the 4 resource sets).

Thus, in this example, the common DCI portion 605 may include the bitmaps corresponding to the 2 expressions of equation (3). The first expression $$\left[\log_2\left[\frac{N_{RB}}{N_{Redcap} * N_{NB}}\right]\right]$$

may identify the starting RBs and number of consecutive RBs for the UE-specific DCI portion 650. The second expression [$\log_2$ K] identifies the resource set including the UE-specific DCI portion 630. In this example, [$\log_2$ K] is set to 0,0 that identifies the Resource Set 0-610. Thus, when the UE 110 decodes the common DCI portion 605, the UE 110 will understand the UE-specific DCI portion 650 is associated with Resource Set 0-610 and, from the first expression, identify the starting RB and number of consecutive RBs for the UE-specific DCI portion 650 as shown in FIG. 6.

In additional exemplary embodiments, the frequency domain location of the UE-specific DCI portion 430 may be signaled using the offset relative to the starting PRB of the common DCI portion 420. For example, a set of offset values may be first configured by higher layers and one of the offset values may then be dynamically signaled using the FDRA field.

As described above, the common DCI portion 420 may also include a TDRA field for both DL and UL scheduling. The UE 110 may be configured with a number of TDRAs by higher layers and one of the TDRAs may then be dynamically signaled using the TDRA field of the common DCI portion 420.

As described above, the common DCI portion 420 may also include a UE-specific DCI portion payload size indicator field that may be used to signal the payload size of the UE-specific DCI portion 430.

In some exemplary embodiments, the UE-specific DCI portion payload size indicator field may be specified by a standard (e.g., 3GPP standards) UE-specific DCI portion payload size indicator field or configured by RRC signaling. One of the candidate sizes may then be dynamically signaled using the 'UE-specific DCI portion payload size indicator field.

In other exemplary embodiments, the UE-specific DCI portion payload size may be indicated by a bitmap signaling. For example, each bit may indicate the presence of the UE-specific DCI portion 430 for a particular UE, e.g. if the bit is set to '1' for the UE 110, this indicates the UE-specific DCI portion 430 payload is present. Otherwise, the UE-specific DCI portion 430 is not present. In this design, the size of UE-specific DCI portion payload $L_{DCI}^{USS}$ can be varied depending on the actual number of scheduled UEs "M" by the common DCI portion 420. For example, $L_{DCI}^{USS}=M*\Delta$, where $\Delta$ is the payload size of the UE-specific DCI portion 430 for a single user. The payload size may be specified by a standard (e.g., 3GPP standards) or configured by RRC signaling.

As described above, the common DCI portion 420 may also include a UE-specific DCI portion resource size indicator field that may be used to signal the resource size of the UE-specific DCI portion 430. This information may be used to reduce the number of blind decoding by the UE 110, e.g., by reducing the search space for UE-specific information in the PDSCH.

In some exemplary embodiments, the resource conveying the UE-specific DCI portion 430 is signaled using aggregation levels. The aggregation level may convert to a number of six RBs over a number of consecutive symbols or a number of resource elements (REs) at which the UE-specific DCI portion 430 may be received and decoded by RedCap devices.

In other exemplary embodiments, the number of consecutive symbols is signaled for UE-specific DCI portion 430 transmissions, starting from the first symbol after the Demodulation Reference Signal (DMRS) symbol over all the RBs allocated by the FDRA field.

In still further exemplary embodiments, the UE-specific DCI portion resource size field signals one $\Delta_{offset}^{DCI}$ set value from a set of offset values that may be configured by RRC signaling. The UE 110 may determine the number of modulation coded symbols/REs of the UE-specific DCI portion resource as a function of, for example, the UE-specific DCI portion payload size (described above), the number of CRC bits and/or the $\Delta_{offset}^{DCI}$ value.

As described above, the common DCI portion 420 may also include an MCS field. In some exemplary embodiments, one value may be signaled and commonly applied for the UE-specific DCI portion 430 and PDSCH/PUSCH transmissions of DL-SCH and UL-SCH.

In other exemplary embodiments, the indicated MCS value in the common DCI portion 420 is only applied for the UE-specific DCI portion 430. The MCS value for PDSCH/PUSCH is further indicated by the UE-specific DCI portion 430. This design allows for the use of different MCS for data transmissions for different UEs even though they are mapped on a single PDSCH/PUSCH resource. This may improve the spectrum efficiency.

The UE-specific DCI portion 430 may be separated into blocks, e.g., Block number 1, Block number 2, . . . , Block number K. In some exemplary embodiments, each block may be configured for a given UE by higher layers. In other exemplary embodiments, different blocks maybe assigned for DL and UL scheduling for a single UE.

The following provides a description of exemplary information (or fields) that may be included in the UE-specific DCI portion 430 of the scheduling information. It should be understood that the following fields are only exemplary. The UE-specific DCI portion 420 may include all the described fields, a subset of the described fields or additional fields not specifically described herein.

The following fields may be used for either DL and/or UL scheduling. In the case of UL scheduling, the following fields may be determined by the UE. In a first example, the UE-specific DCI portion 430 may include an MCS field. In some exemplary embodiments, when an MCS field is also present in the common DCI portion 420, a delta MCS or MCS update information relative to the MCS indicated by the common DCI portion 430 with less bits may be included in this field. In other exemplary embodiments, one MCS field may be shared by all blocks, instead of within each block to reduce signaling overhead.

In a second example, the UE-specific DCI portion 430 may include a new data indicator (NDI) field. In a third example, the UE-specific DCI portion 430 may include a redundancy version (RV) field. In a fourth example, the UE-specific DCI portion 430 may include a HARQ process number (HPI) field. In a fifth example, the UE-specific DCI portion 430 may include a UE-ID or UE-specific index filed determined by a UE-ID. The UE-index may be configured by RRC signaling or determined according to the UE-ID based on a hard-encoded equation. In a sixth example, the UE-specific DCI portion 430 may include a TPC command field for the scheduled PUCCH/PUSCH.

The following fields may be used for PDSCH scheduling. In a first example, the UE-specific DCI portion 430 may include a downlink assignment index (DAI) field. In a second example, the UE-specific DCI portion 430 may include a PUCCH resource indicator (PRI) field. In a third example, the UE-specific DCI portion 430 may include a PDSCH-to-HARQ_feedback timing indicator field. It should be noted that in the above examples, one or more of the described fields may be included in the common DCI portion 420.

Figure 7:
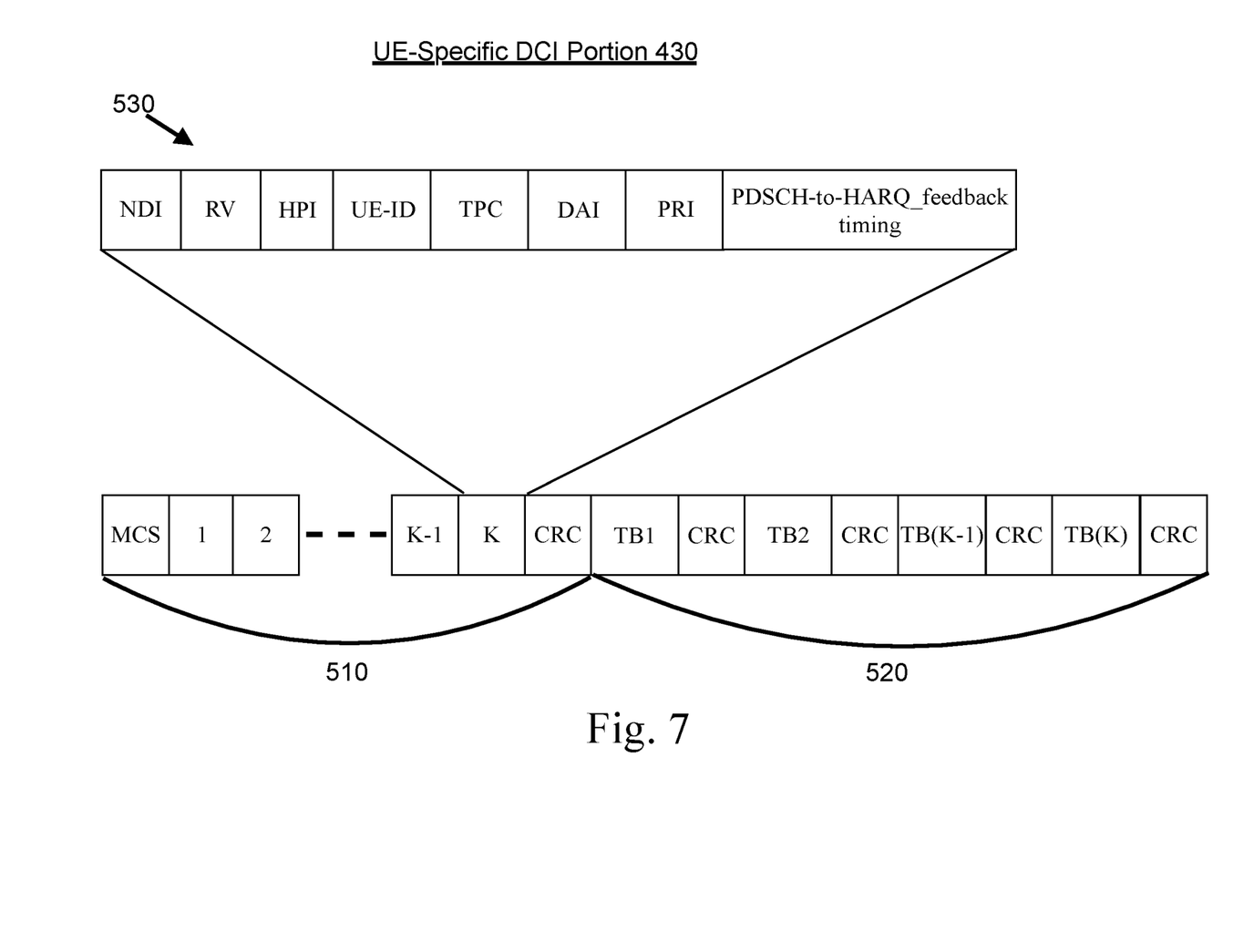
FIG. 7 shows an exemplary UE-specific DCI portion according to various exemplary embodiments.

FIG. 7 shows an exemplary UE-specific DCI portion 430 according to various exemplary embodiments. The exemplary UE-specific DCI portion 430 includes K blocks 710 and, as described above, each block may be associated with a different UE. In this example, the UE-specific DCI portion 430 has a shared MCS field 715 and may be applied for all transport blocks (TBs) 720 scheduled by this DCI. The TBs 720 for different UEs may be scrambled with a UE-specific sequence prior to modulation, which is generated based on dedicated UE-ID or the common RNTI (C-RNTI). In some exemplary embodiments, different scrambling sequences may be used for UE-specific DCI partition bits. For example, in some embodiments, the UE-specific DCI portion 430 bits are scrambled by a group-common sequence based on a group-common RNTI, which is same as common DCI portion 420. In other exemplary embodiments, different scrambling sequences are generated on a per UE basis based on the C-RNTI and then applied to different blocks corresponding to the UE associated with the block for the scrambling operation. In addition, FIG. 7 shows the exemplary fields 730 for the UE-specific DCI portion 430 for block K. As described above, the block K (and other blocks) are not required to have all these fields.

A variety of approaches may be used for the resource elements (Res) for the UE-specific DCI portion 430 transmission. In some exemplary embodiments, the modulated symbols may be mapped starting from the first symbol of resources allocated by the common DCI portion 420 in the order of increasing frequency and starting from the lowest frequency. The data symbols in the PDSCH may then be appended at the end of the sequence of UE-specific DCI portion 430 first and then RE mapping may be performed. In other exemplary embodiments, the modulated symbols may be mapped starting from the first RE in the lowest frequency of resources allocated by the common DCI portion 420 in the order of increasing symbol index (e.g., time domain). In any approach, the symbols should be rate-matched around the DMRS symbols.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

Although this application described various aspects each having different features in various combinations, those skilled in the art will understand that any of the features of one aspect may be combined with the features of the other aspects in any manner not specifically disclaimed or which is not functionally or logically inconsistent with the operation of the device or the stated functions of the disclosed aspects.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A user equipment (UE), comprising:
a transceiver configured to connect to a base station of a network; and
a processor communicatively coupled to the transceiver and configured to perform operations comprising:
monitoring a first physical resource to receive a common downlink control information (DCI) portion of scheduling information for the UE, wherein the first physical resource is a Physical Downlink Control Channel (PDCCH) and wherein the common DCI portion includes a Frequency Domain Resource Assignment (FDRA) field comprising a first bitmap, wherein the first bitmap identifies a resource block (RB) starting index for the UE-specific DCI portion based on at least one of an uplink or downlink bandwidth or a bandwidth allocated for the UE, and further wherein the common DCI portion varies a UE-specific DCI portion payload size based on a number of scheduled UEs;
decoding the common DCI portion to determine information for a UE-specific DCI portion that is transmitted by the base station on a second physical resource, wherein the second physical resource is a Physical Downlink Shared Channel (PDSCH);
monitoring the second physical resource for the UE-specific DCI portion based on at least the information from the common DCI; and
decoding the UE-specific DCI portion based on at least the information from the common DCI.

2. The UE of claim 1, wherein the common DCI portion further comprises one of a DCI Format Flag, a Time Domain Resource Allocation (TDRA) field, a UE-specific DCI portion payload size indicator field, a UE-specific DCI portion resource size indicator field or a Modulation and Coding Scheme (MCS) field.

3. The UE of claim 1, wherein the FDRA field further comprises a second bitmap including a set of contiguously allocated non-interleaved virtual resource blocks.

4. The UE of claim 1, wherein the FDRA field further comprises a second bitmap including a set of non-overlapping consecutive physical resource blocks (PRB) associated with the narrow bandwidth.

5. The UE of claim 1, wherein the FDRA field further comprises a second bitmap including an identification of a resource set that includes the UE-specific DCI portion.

6. The UE of claim 2, wherein a UE-specific DCI portion payload size comprises a plurality of preconfigured sizes and the UE-specific DCI portion payload size indicator field comprises an indication of one of the plurality of preconfigured sizes.

7. The UE of claim 2, wherein the UE-specific DCI portion payload size indicator field comprises an indication of whether the UE has a UE-specific DCI portion payload present.

8. The UE of claim 2, wherein the UE-specific DCI portion resource size indicator field comprises one of (i) an aggregation level of the UE-specific DCI portion, (ii) a number of consecutive symbols starting from a first symbol after a demodulation reference signal (DMRS) symbol over all resource blocks allocated by the FDRA field, or (iii) an offset value from a set of offset values.

9. The UE of claim 1, wherein UE-specific DCI portion comprises a plurality of blocks, and wherein one of (i) each block is configured for a specific one of the plurality of UEs or (ii) each block is assigned for one of downlink or uplink scheduling for a single UE.

10. The UE of claim 1, wherein the UE-specific DCI portion comprises one of a new data indicator (NDI) field, a redundancy version (RV) field, a HARQ process number (HPI) field, a UE-ID field, a UE-specific index field, a TPC command field, a downlink assignment index (DAI) field, a PUCCH resource indicator (PRI) field or a PDSCH-to-HARQ_feedback timing indicator field.

11. The UE of claim 1, wherein the common DCI portion is scrambled with a group-common Radio Network Temporary Identifier (RNTI) and the UE-specific DCI portion is scrambled based on the group-common RNTI or based on a common RNTI (C-RNTI).

12. A baseband processor configured to perform operations comprising:
 monitoring a first physical resource to receive a common downlink control information (DCI) portion of scheduling information for the UE, wherein the first physical resource is a Physical Downlink Control Channel (PDCCH) and wherein the common DCI portion includes a Frequency Domain Resource Assignment (FDRA) field comprising a first bitmap, wherein the first bitmap identifies a resource block (RB) starting index for the UE-specific DCI portion based on at least one of an uplink or downlink bandwidth or a bandwidth allocated for the UE;
 decoding the common DCI portion to determine information for a UE-specific DCI portion that is transmitted by the base station on a second physical resource, wherein the second physical resource is a Physical Downlink Shared Channel (PDSCH);
 monitoring the second physical resource for the UE-specific DCI portion based on at least the information from the common DCI; and
 decoding the UE-specific DCI portion based on at least the information from the common DCI, and further wherein the common DCI portion varies a UE-specific DCI portion payload size based on a number of scheduled UEs.

13. The baseband processor of claim 12, wherein the common DCI portion further comprises one of a DCI Format Flag, a Time Domain Resource Allocation (TDRA) field, a UE-specific DCI portion payload size indicator field, a UE-specific DCI portion resource size indicator field or a Modulation and Coding Scheme (MCS) field.

14. The baseband processor of claim 12, wherein the FDRA field further comprises a second bitmap including a set of contiguously allocated non-interleaved virtual resource blocks.

15. The baseband processor of claim 12, wherein the FDRA field further comprises a second bitmap including a set of non-overlapping consecutive physical resource blocks (PRB) associated with the narrow bandwidth.

16. The baseband processor of claim 12, wherein the FDRA field further comprises a second bitmap including an identification of a resource set that includes the UE-specific DCI portion.

17. The baseband processor of claim 13, wherein a UE-specific DCI portion payload size comprises a plurality of preconfigured sizes and the UE-specific DCI portion payload size indicator field comprises an indication of one of the plurality of preconfigured sizes.

18. The baseband processor of claim 13, wherein the UE-specific DCI portion payload size indicator field comprises an indication of whether the UE has a UE-specific DCI portion payload present.

19. The baseband processor of claim 12, wherein UE-specific DCI portion comprises a plurality of blocks, and wherein one of (i) each block is configured for a specific one of the plurality of UEs or (ii) each block is assigned for one of downlink or uplink scheduling for a single UE.

20. The baseband processor of claim 12, wherein the UE-specific DCI portion comprises one of a new data indicator (NDI) field, a redundancy version (RV) field, a HARQ process number (HPI) field, a UE-ID field, a UE-specific index field, a TPC command field, a downlink assignment index (DAI) field, a PUCCH resource indicator (PRI) field or a PDSCH-to-HARQ feedback timing indicator field.

* * * * *